(12) United States Patent
Cirette et al.

(10) Patent No.: US 11,548,738 B2
(45) Date of Patent: Jan. 10, 2023

(54) DEVICE AND METHOD FOR TRANSFERRING PRODUCTS

(71) Applicant: SIDEL PACKING SOLUTIONS, Corcelles-les-Citeaux (FR)

(72) Inventors: Damien Cirette, Corcelles-les-Citeaux (FR); Dominique Rabec, Corcelles-les-Citeaux (FR)

(73) Assignee: SIDEL PACKING SOLUTIONS, Corcelles-les-Citeaux (FR)

( * ) Notice: Subject to any disclaimer, the term of this patent is extended or adjusted under 35 U.S.C. 154(b) by 0 days.

(21) Appl. No.: 17/280,858

(22) PCT Filed: Sep. 25, 2019

(86) PCT No.: PCT/EP2019/075907
§ 371 (c)(1),
(2) Date: Mar. 26, 2021

(87) PCT Pub. No.: WO2020/064860
PCT Pub. Date: Apr. 2, 2020

(65) Prior Publication Data
US 2021/0403251 A1  Dec. 30, 2021

(30) Foreign Application Priority Data
Sep. 26, 2018 (FR) ....................... 1858816

(51) Int. Cl.
*B65G 47/82* (2006.01)
(52) U.S. Cl.
CPC ...... *B65G 47/82* (2013.01); *B65G 2201/0244* (2013.01); *B65G 2201/0252* (2013.01)

(58) Field of Classification Search
CPC .................. B65G 47/82; B65G 47/082; B65G 2201/0252; B65G 2201/0244
USPC ......................................................... 198/429
See application file for complete search history.

(56) References Cited

U.S. PATENT DOCUMENTS

| | | | | |
|---|---|---|---|---|
| 2,470,795 A | * | 5/1949 | Socke | ..................... B65B 35/50 53/244 |
| 2,556,082 A | * | 6/1951 | Hartness | ................. B65B 21/04 53/495 |
| 3,771,648 A | * | 11/1973 | Revuelta | .............. B65G 47/845 198/364 |

(Continued)

FOREIGN PATENT DOCUMENTS

| | | |
|---|---|---|
| DE | 4322008 A1 | 1/1995 |
| JP | 2008044707 A | 2/2008 |

(Continued)

OTHER PUBLICATIONS

International Search Report dated Nov. 26, 2019 for PCT/EP2019/075907.

*Primary Examiner* — James R Bidwell

(57) ABSTRACT

The present invention relates to a device for transferring products, comprising a means for fetching the products in a line in a first direction, at least one output conveyor, in a transverse direction with respect to said first direction, and a tool for transferring said products in groups. The transfer tool has only two degrees of freedom of movement in a horizontal plane, in said first direction and in said transverse direction. The invention relates also to a corresponding method for transferring products.

16 Claims, 3 Drawing Sheets

(56) References Cited

U.S. PATENT DOCUMENTS

| | | | | |
|---|---|---|---|---|
| 3,826,381 | A | * | 7/1974 | Kulig ..................... C03B 35/12 |
| | | | | 198/428 |
| 3,987,889 | A | * | 10/1976 | Godoy .................. B65G 47/82 |
| | | | | 198/429 |
| 4,104,984 | A | * | 8/1978 | Kellermann ............ B05C 1/025 |
| | | | | 118/227 |
| 5,464,088 | A | * | 11/1995 | Koerber ................ B65G 43/08 |
| | | | | 198/364 |
| 8,695,781 | B2 | * | 4/2014 | Mougin ................ B65G 47/82 |
| | | | | 198/431 |

FOREIGN PATENT DOCUMENTS

| | | | | |
|---|---|---|---|---|
| NL | 1001826 C1 | | 6/1997 | |
| WO | 2019/228901 | * | 12/2019 | ............. B65G 47/82 |

\* cited by examiner

DEVICE AND METHOD FOR TRANSFERRING PRODUCTS

The present invention lies in the field of the conveying of products in a production line, preferably for the grouping together and packaging of said products.

Such products consist of containers, such as flasks, bottles, cans or brick packs, or even boxes. These products are generally made of plastic or metallic material or even of glass.

The products undergo a first phase, called production phase, during which they are finalized unitarily through a succession of several steps in corresponding modules, such as filling, plugging and labelling.

Then, said products, ready for use, undergo a second step of packaging in batches, each batch consisting of the grouping together, staggered or not, of several products in a matrix arrangement, generally of overall square or rectangular parallelepipedal form.

The products belonging to one and the same batch are then secured to one another for example through a step of packaging in cardboard boxes or a film-wrapping step making it possible to obtain packs or bundles.

More specifically, during the film wrapping, being carried out in a film-wrapping machine, the products are held together in batches by a wrapping consisting of a heat-shrinkable film. In particular, once the batches of products are covered with a sheet of film, they pass through a heat treatment module, consisting of at least one oven, notably a tunnel oven. The heat-shrinkable material of said film then hugs the outer form of the batch of products under the action of heating, holding them together. The batch thus wrapped and held tight by said shrunk film is cooled at the output of the oven, in order to confer a sufficient mechanical strength for its handling and its transportation.

As is known, one existing solution for forming the batches consists in conveying the products in a disorderly fashion or staggered across the entire width of a conveyor. The products are thus routed to a sorting station to align the products one behind the other in several lines. More upstream, at the input, said sorting station generally comprises a constriction, in the form of walls converging from upstream to downstream, making it possible to channel the cluster of products transported over the entire width of the conveyor.

Consequently, a recurrent problem lies in the interface between the convergent walls and the input, provoking product blockages which prevent the routing to certain lines of the sorting station, even leading to a jam at the input. Since the conveyor continues to drive the products, a dropping of one or more products often occurs, necessitating a stoppage of production to re-establish the circulation by removing or assembling the fallen products. Furthermore, in the case of glass products, a drop can break them, once again inducing a stoppage and the cleaning of the installation.

Furthermore, such an installation presents the drawback of occupying a lot of space in that the products generally leave the preceding machine, dedicated to delivering finalized products unitarily, in a single-file flow. Several meters of conveyors are effectively necessary to widen the flow to obtain a loose arrangement. Furthermore, the installation is particularly long in this case because the zone used to arrange the products in several lines is in the axis of the machine, for example a film wrapper or a case packer.

Alternatively, in order to avoid these drawbacks, the products can be conveyed in single file, one after the other. Such a configuration of the products in a single line notably makes it possible to adapt directly at the output of modules situated upstream and which deliver products in a single file, following a unitary treatment of each of said products. The conveyors are also less costly and less bulky.

The present invention is limited to a transfer of products fetched in single file.

One existing solution therefore consists in transferring the products laterally, preferably orthogonally, with respect to their fetching direction, to an output conveyor. This right-angled transfer makes it possible to save considerable space. Furthermore, it makes it possible to transfer the line of products by displacing successive groups, and thus forming batches formed by one or more groups of products aligned along the transfer direction.

The issue consists in changing the successive groups of products from a single file state to a state in which said groups are located one behind the other, in a transverse direction, notably an orthogonal direction.

In addition, a transverse transfer implies management of the rate of advance of the products in the fetching direction, in order to displace them in a transverse direction. Indeed, if they undergo an excessive deceleration or acceleration, even if they undergo considerable friction notably on their bottom resting on the conveying surfaces, the products risk dropping during their transfer.

Furthermore, this transfer is performed by a push applied on the side opposite the products with respect to the output conveyor, inducing an impact which is once again likely to make them fall at that moment.

One existing solution consists of an overhanging cycler device. This is a rotary transfer device provided with a multitude of tools in the form of arms extending in the direction of fetching of the products and mounted overhanging at one of their ends, the opposite end being free. They are driven and supported by an endlessly mounted belt or chain or by a carousel. By their rotation, the tools come successively into contact with several products and push them in groups, from the input conveyor to the output conveyor transversely to the fetching direction.

Now, it is found that a tool entering into contact with the products provokes impacts likely to unbalance a product, even make it fall. First of all, in the fetching direction, the products are blocked against an end stop fixed orthogonally with respect to their fetching direction, inducing a first impact. Furthermore, when a moving arm comes into contact with several products, it induces another impact, parallel to their fetching direction, likely once again to provoke an unbalancing of products, even products dropping.

Moreover, in order to limit the risk of dropping of the products at the moment of their transfer by transverse push, and to best avoid said first impact in the fetching direction, the progress of the products should be slowed down. In order to do that, the end stops of the tools, or the tools or even all of the transfer device can be mounted to translate in the fetching direction, allowing the products to be slowed down in this direction of advance, before they are transferred to the output conveyor. This displacement in the fetching direction also makes it possible to limit the impact of the first product of the line against an end stop of the tool, limiting the risks of dropping or of damage. In fact, the displacement in the fetching direction makes it possible to perform a relative displacement of the end stop, allowing for a gradual reduction of speed and therefore avoiding an impact on the product.

However, such a solution does not in any way prevent the other transverse impact at the moment of contact of the tools with the products for them to be pushed. In fact, making the speed of displacement of each of the tools, all of which are secured to one and the same motorization by belt or around a carousel, is very complicated.

In addition, this type of rotary device makes the transfer of voluminous products with a significant weight complicated, above all at a high production rate. In fact, the overhanging mounting of the tools does not offer sufficient rigidity at their free opposite end, inducing a twisting that is prejudicial, on the one hand, to the desired alignment of the products during their transfer and, on the other hand, to the mechanisms and components of such a device.

Furthermore, one drawback of the rotary devices lies in their bulk in terms of height, because of the diameter of the carousel or of the return path of the belt driving the tools.

One example of such a rotary transfer device is described in the document WO 2018/073529.

The subject of the invention is a transfer of products conveyed in a first, fetching direction to an output conveyor extending in another, transverse direction.

The aim of the invention is to mitigate the drawbacks of the state of the art by proposing a transfer performed horizontally, by a tool mounted for displacement according to only two degrees of freedom in a horizontal plane.

Even more, the invention makes it possible to displace the tool, on the one hand, in the direction of fetching of the products, eliminating any impact in this direction of advance of the products and, on the other hand, in a transverse direction, preferably orthogonal, with respect to said fetching direction, without provoking impact at the moment of this transverse push of said products, notably through an accurate setting of the transverse displacement of said tool.

For this, the invention relates to a device for transferring products, comprising:

a means for fetching products one behind the other in a first direction, at least one output conveyor extending from said fetching means, in a transverse direction with respect to said first direction, a tool for transferring said products in groups from said fetching means to said output conveyor.

Such a transfer device is characterized in that said transfer tool comprises only two degrees of freedom of movement in a horizontal plane, in said first direction and in said transverse direction.

Additionally, and in a nonlimiting manner, such a transfer device can comprise means for motorizing the displacement of said transfer tool, provided with at least two actuators controlling the displacements of the tool for each of said two degrees of freedom independently.

Said device can comprise two runners extending parallel to said first direction and to said transverse direction, said transfer tool being mounted to be movable in translation along each of said runners.

Said transverse direction can be orthogonal to said first direction.

Said transfer tool can comprise a pusher of said products extending parallel to said first direction, said pusher comprising at least one plate or one collector.

The transfer tool can comprise an end stop fixed so as to be adjustable in the first direction.

The device can comprise a movable member for retaining the products.

Said member can be embedded on said transfer tool.

Said retaining member can comprise at least one arm pivoting from a transverse position of holding of the products to a retracted position, and vice versa.

The invention relates also to a method for transferring product, in which at least:

the products are fetched one behind the other in a first direction, said products are transferred by means of a tool in a direction transversal to said first direction, to at least one output conveyor.

Such a transfer method is characterized in that, during the transfer, at least:

the advancing of said products in the first direction is slowed down, said products are displaced by translation of said tool in a direction transversal to said first, fetching direction.

Additionally, and in a nonlimiting manner, said products can begin to be displaced in the transverse direction while they are being slowed down in the first direction.

The products can be displaced orthogonally with respect to said first direction.

Said products can be grouped together when they are fetched, prior to said transfer, and in that the products are transferred in groups.

Said products can be held at least transversely during their transfer.

Said products can be held at the top during and/or after their transfer across an upper conveyor.

Other features and advantages of the invention will emerge from the following detailed description of the nonlimiting embodiments of the invention, with reference to the attached figures in which.

Figure 1:
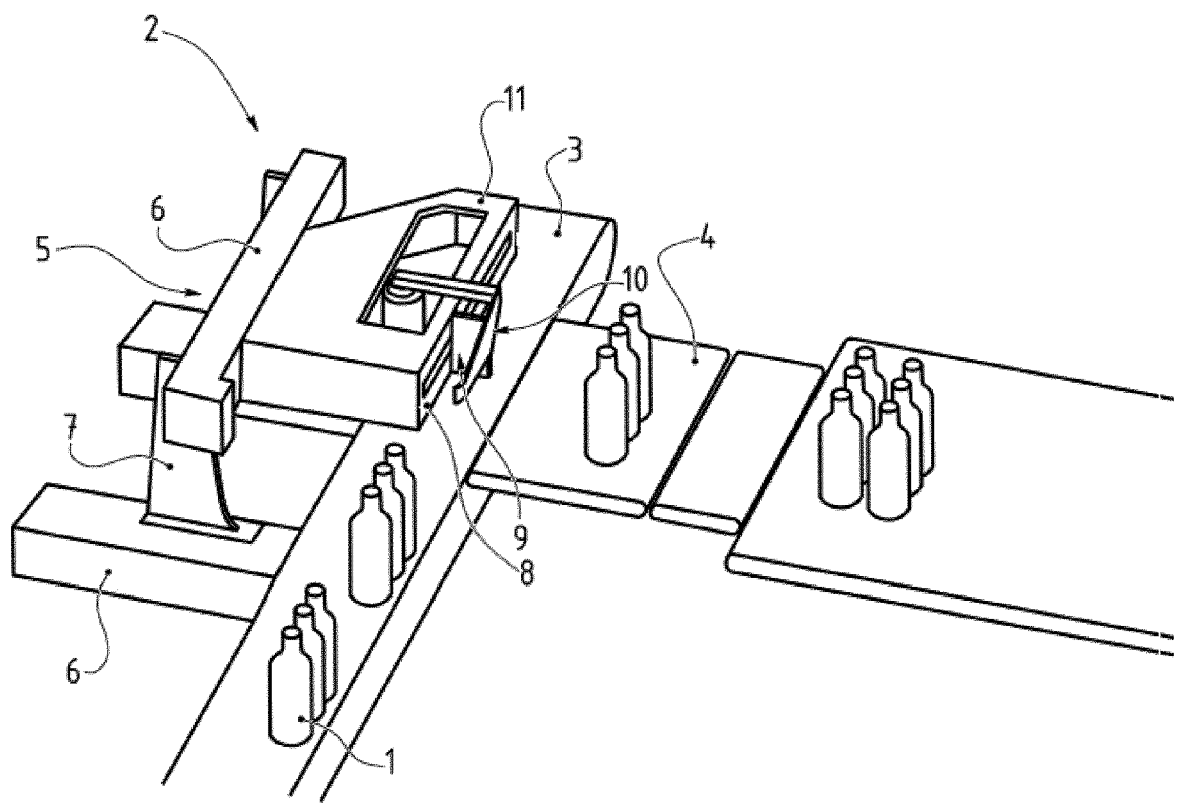
FIG. 1 represents a perspective view of an embodiment of a device for transferring products.
Figure 2:
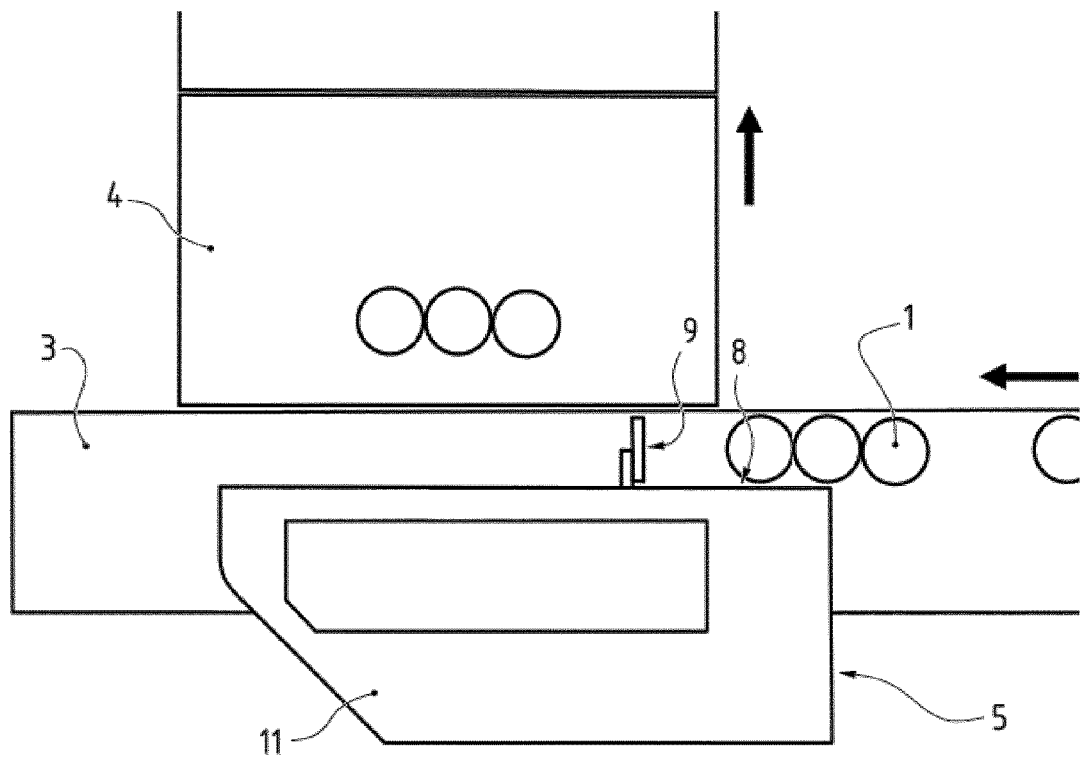
FIG. 2 represents a simplified top view of said device during a first step before transfer of products grouped together.
Figure 3:
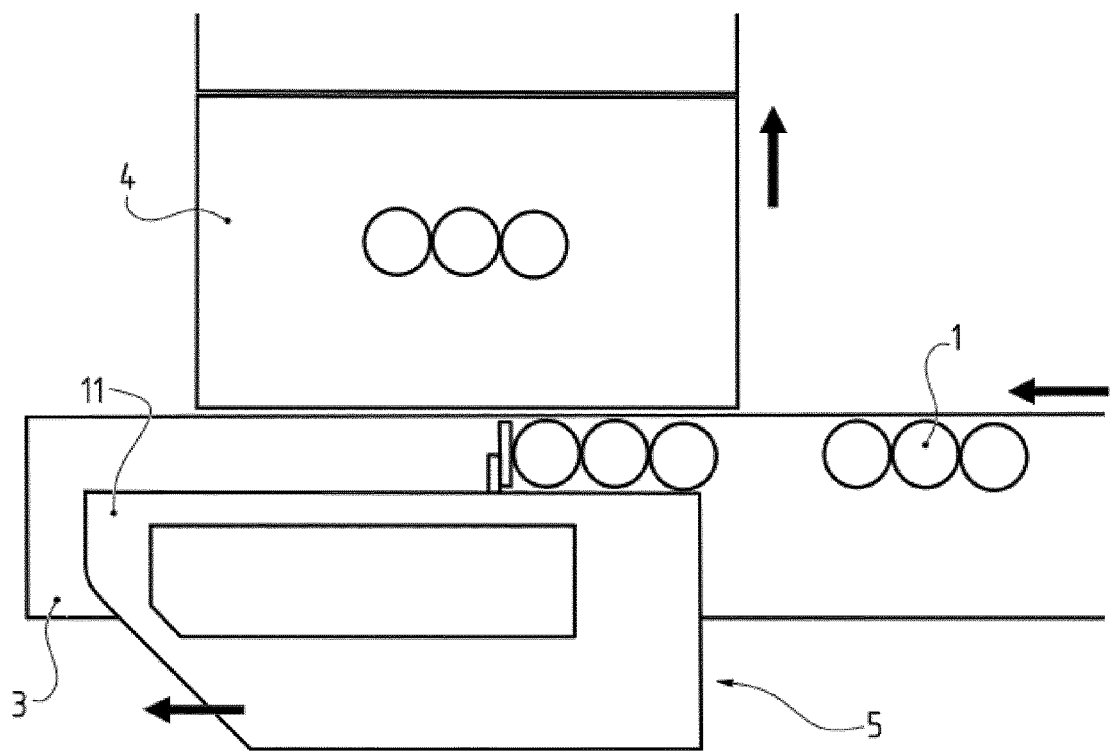
FIG. 3 represents a simplified top view of said device during a second transfer step, showing the slowing-down of a group of products by displacement of said tool in the first, fetching direction.

The present invention relates to the transfer of products 1 in a production line and its subject is a transfer device 2 and a method for transferring said products 1.

Such products 1 consist of containers, such as flasks, bottles, cans or brick packs, or even boxes. These products are generally made of plastic or metallic material or even of glass.

The products 1 are routed from a station situated upstream, to a station situated downstream. As a nonlimiting example, an upstream station can be a labelling machine, while a downstream station can be a film-wrapping machine or a case packer.

For this, the device 2 comprises a means 3 for fetching products one behind the other. In other words, the products 1 are transported in single file, aligned one after the other.

It will be noted that several products 1 can be fetched in groups of at least two products 1. Even more, a group of products 1 comprises a series of products 1 aligned along said fetching direction in a line. The products 1 can be attached, that is in contact with one another. Alternatively, the products 1 can be close to one another, spaced apart by an interval. Consequently, two adjacent products 1 of one and the same group are spaced apart in the fetching direction by a distance generally less than the dimension, notably the diameter or the length, along the fetching direction, of a product 1. The groups are spaced apart from one another in the fetching direction by a separation generally greater than the distance existing between two successive products 1 of one and the same group, preferentially according to a separation greater than the dimension of a product, notably its diameter or its length along the fetching direction.

As a variant, it would also be possible to fetch the products ungrouped, with a space that is for example constant between each of them. In this case, the grouping can be performed upon the arrival of the products 1 at the transfer device 1.

Several groups of products 1 are then transported, for example at regular intervals, on the top face of the fetching means 3. Such grouping can be performed directly at the output of the station situated upstream or else via a station dedicated to such grouping, for example a spacer or a feed screw.

Preferentially, said fetching means 3 can comprise a conveyor of endless belt type. The products 1 are therefore conveyed on the top face of such a conveyor.

The fetching means 3 displaces the products 1 in a first direction, also called "fetching direction". As can be seen in the examples of FIGS. 2 to 5, said first direction extends from right to left.

The device 2 comprises at least one output conveyor 4. It extends from said fetching means 3, in a transverse direction with respect to said first direction. Several output conveyors can succeed one another, notably with different driving speeds. Thus, by successively transferring groups of products 1, by modifying the speeds of the different output conveyors 4, it is possible to tighten up said groups in order to form a batch composed of several groups side-by-side along the transverse direction.

Preferentially, the fetching means 3 and the conveyor 4 extend in a horizontal or substantially horizontal plane. Furthermore, they are adjacent flush with one another, at least along a part of their contiguous edges. Furthermore, a sliding bed can be positioned between said contiguous edges, in order to ensure the flatness of the surface of the fetching means 3 and of the conveyor 4.

The device 2 also comprises a tool 5 for transferring said products, in principle in groups from said fetching means 3 to said output conveyor 4. The tool 5 therefore ensures the transfer of the products 1 from the first, fetching direction, at least to said transverse direction.

Preferentially, but in a nonlimiting manner, said transverse direction can be orthogonal to said first direction. As can be seen in the examples of FIGS. 2 to 5, said transverse direction extends from bottom to top.

According to other embodiments, not represented, the transverse direction can extend in an angularly inclined manner with respect to the first, fetching direction of the products 1.

Preferentially, the first, fetching direction and the transverse direction are situated in the same horizontal plane.

Advantageously, said transfer tool 5 has only two degrees of freedom of movement in a horizontal plane, in said first direction and in said transverse direction. Preferentially, the tool 5 is only actuated by a first displacement parallel to the fetching direction, by another displacement parallel to the transverse direction, and according to the displacements resulting from the combination of said first and other displacements. In a specific case of a first displacement and of another displacement in the form of translations, the resulting trajectory of the products 1 can be a rotation.

According to another possibility, when the first direction is rectilinear and when the transverse direction is curved, the tool 5 can be actuated by a first displacement parallel to the fetching direction, corresponding to a translation, and by another displacement along a curved trajectory, notably in rotation, parallel to the transverse direction.

To this end, the device 2 can comprise means for motorizing the displacement of said tool 5, provided with at least two actuators managing the displacements of the tool 5 for each of said two degrees of freedom independently. To sum up, it is possible to determine the trajectory of the tool 5 by distinctly configuring the displacements in each of the fetching and transverse directions.

Such a configuration is possible through two independent actuators, but also through actuators that are mutually servocontrolled, mechanically or virtually, like interpolated motors. The actuators can for example be represented by linear motors, by brushless motors or even by belts with dual motorization, such as, for example, a linear table motorization, called "H-BOT", which is composed of a single belt whose trajectory overall forms an "H", the motorization being done on two legs of the H, while the displacement of the table, which is fixed onto the horizontal bar of the H, is derived from the combination of the displacements induced by the two motors.

According to one embodiment, as can be seen in FIG. 1, the device 2 can comprise at least two runners 6 extending parallel to said first direction and to said transverse direction. Said transfer tool 5 is mounted to be movable in translation along each of said runners 6. Consequently, at least one first actuator allows the tool 5 to be displaced along the runner 6 extending in the first, fetching direction, while at least one second actuator allows the tool 5 to be displaced along the other runner 6 in the transverse direction.

In particular, the runner 6 extending in the first, fetching direction can be supported by a portal structure 7 mounted on one or more runners 6 extending transversely.

In order to ensure the transfer of the products 1, said tool 5 can comprise a pusher 8 extending parallel to said first direction. Said pusher 8 can comprise at least one plate or one collector. Said plate can be composed of a vertical wall, extending along the first, fetching direction. Said collector has a cellular form, comprising overall concave housings, suitably conformed to ensure the at least partial insertion of the products 1.

Regarding certain specific forms of products 1, for example an oval form, it is possible to produce specifically conformed housings, in order to receive the products 1 while retaining their orientation.

During the displacement of the products 1 by the fetching means 3 in the first direction, the tool 5 can be displaced to come into contact with said products 1, while following their progress. In particular, the pusher 8 is brought against the walls of the products 1, from bottom to top in the examples represented, while being displaced to the left at a speed equivalent to the driving speed of the products 1 by the fetching means 3. Consequently, the tool 5 does not provoke any transverse impact with the products 1, avoiding unbalancing them. The landing of the tool 5 is performed gently.

In particular, the landing can be programmed, with respect to the rate of production and supply of products 1 by the fetching means 3.

Furthermore, sensors, notably optical or laser, can be added to detect the location of the products 1 during their displacement, allowing the landing trajectory of the tool 5 to be automatically modified. Dynamic displacements are then obtained, that are adapted in real time to the fetching of the products 1.

To transversely transfer the products 1, it is preferable to slow them down. To do this, the tool 5 can comprise an end stop 9.

According to one embodiment, such an end stop 9 can be fixed so as to be adjustable in the first direction. To sum up, it is possible to set the position along the pusher 8, notably as a function of the number of products 1 to be transferred simultaneously, in particular as a function of the width of each group, namely the number and diameter thereof, and, possibly, their spacing distance. This setting is done manually or automatically, via an independent actuator embedded in said tool 5. Such a setting is performed offline, before production is launched for a particular format of products 1, for a given grouping. In this case, the tool 5 is displaced during production in the first, fetching direction of the products 1 via the displacement of its frame 11, and it is then the changes of speed of the tool 5 which can accompany and induce a slowing-down of a group of products 1 at the moment of their transfer.

According to another embodiment, the end stop 8 can be designed to be movable with respect to said tool 5, in particular along the pusher 8. Thus, the displacement of said end stop 9 can confer the relative mobility of the tool 5 in the first, fetching direction, while the frame 11 can remain fixed. The displacement of the end stop 9 can also be combined with one and/or the other of the displacements in the first direction or the other direction of the frame 11 of the tool 5. The end stop 9 is then motorized independently by at least one of said actuators or a dedicated actuator, namely in the first, fetching direction. Thus, the mobility of the end stop 9 with respect to the tool 5 makes it possible to accompany and retain, downstream, the products 1 during their deceleration.

Consequently, the displacement of the tool 5, because of the mobility of the end stop 9 with respect to the frame 11 and/or because of the mobility of its frame 11, makes it possible, when the products 1 are loaded, to ensure a contact without impact in the fetching direction, since the tool 5 is first of all placed alongside said products 1 at the same speed as the fetching means 3. Also, the end stop 9 makes it possible to slow down the products 1, by reducing the speed of displacement in the first, fetching direction.

Furthermore, this slowing-down can be performed gradually, by reducing the speed of displacement in the fetching direction of the tool 5, gradually increasing the slowing-down of the products 1, without applying excessive deceleration likely to bump or modify the position of the products 1. This gradual slowing-down can be provoked by and/or combined with the displacement of the end stop 9 when it is movable with respect to the tool 5. Even more, the slowing-down can comprise a speed differential between the progress of the products 1 and the speed of displacement of the frame of the tool 5 and/or of the end stop 9, the differential being controlled in such a way that it is attenuated, notably it is cancelled or virtually zero, at the moment of the landing of the products 1 against the end stop 9, whether that is fixed or movable. Such synchronized control ensures a reduction of the difference between the speeds of the products 1 and of the tool 5 (and/or of its end stop 9) until a zero or approximately zero distance is obtained between said end stop 9 and the first product 1 of the group to be transferred, eliminating any prejudicial impact.

Figure 4:
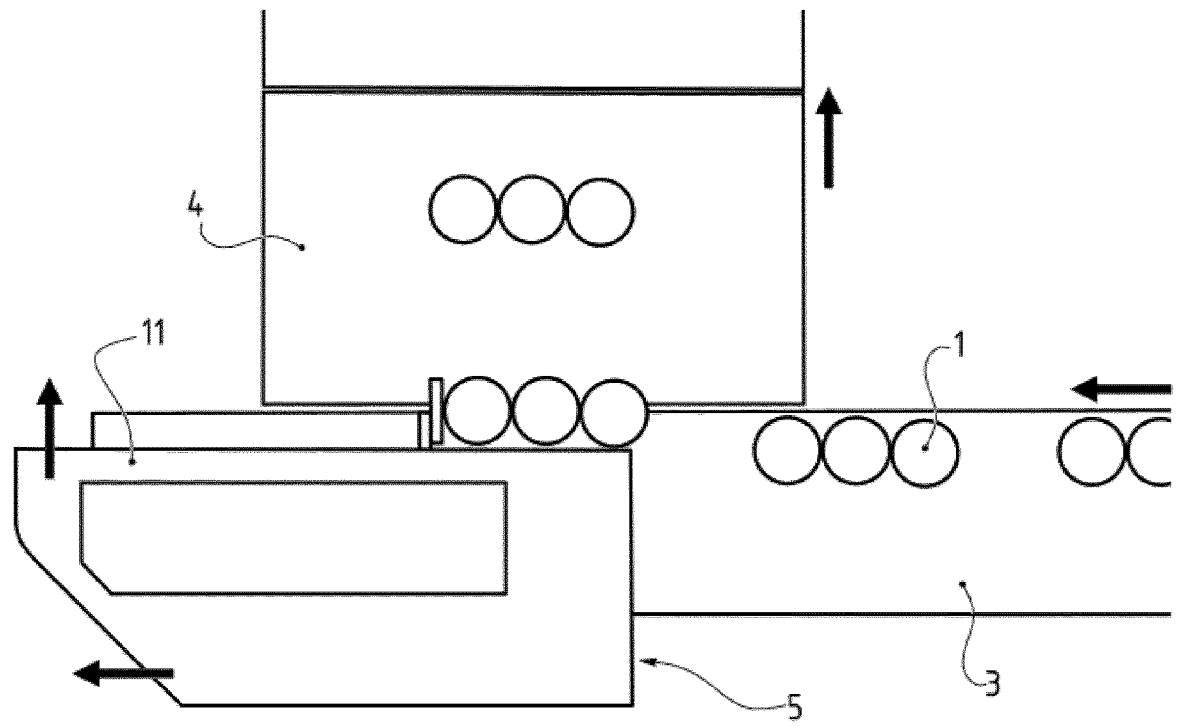
FIG. 4 represents a simplified top view of said device during a third transfer step, showing the transverse displacement of a group of products while they are being slowed down.

During this slowing-down, preferentially after the start and before the end, the transverse direction can be applied by the tool 5, by pushing the products 1 in said transverse direction, as can be seen in FIG. 4. To sum up, the products 1 begin to be pushed while they are slowing down.

According to another possibility, the displacement in said transverse direction can take place after the slowing-down of the products 1, or even before. To sum up, the products 1 are not made to decelerate before beginning to push them transversely.

Furthermore, the slowing-down in the first, fetching direction is performed mostly approximately at the same time as the acceleration in the transverse direction, such that the force component generated by the two accelerations chocks the products 1 in the corner formed by the pusher 8 and the end stop 9, enhancing their stability during these displacements.

Figure 5:
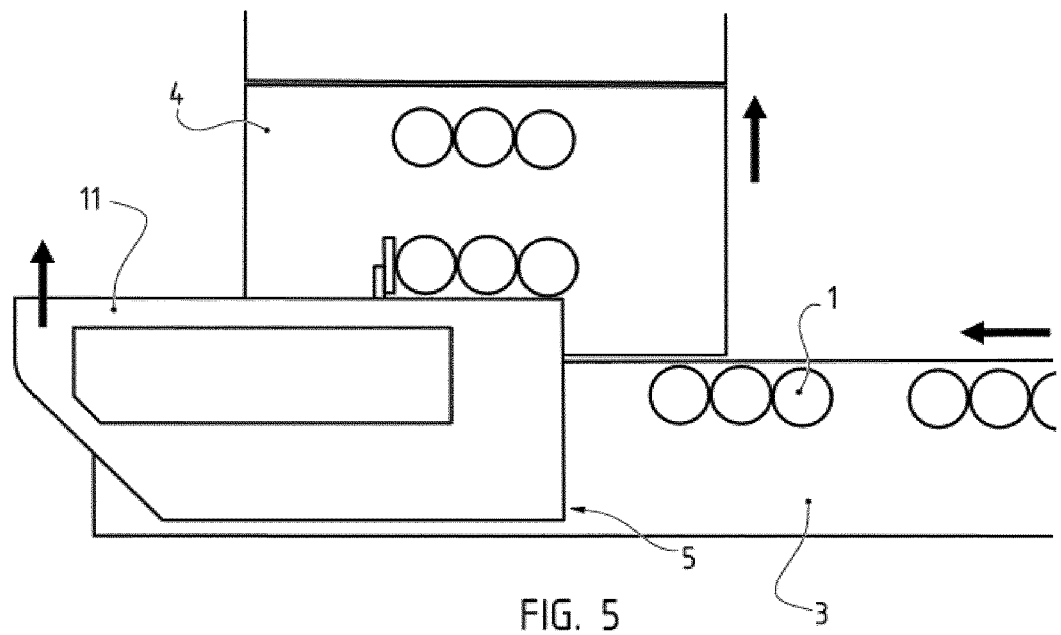
FIG. 5 represents a simplified top view of said device during a fourth transfer step, showing a purely transverse displacement of a group of products.

Then, preferentially, the slowing-down is stopped and only the transverse push is applied, as can be seen in FIG. 5.

In particular, the stopping of the slowing-down of the displacement in the first, fetching direction can be performed before the products 1 leave the surface of the fetching means 3 and are displaced onto the surface of the output conveyor 4.

In order to improve the holding of the products 1 during their transfer, whether at the moment of their deceleration in the first, fetching direction, combined or not with the transverse displacement, or even during this transverse displacement only, the device 2 can comprise a member 10 for retaining the products 1.

Said member 10 is designed to be movable.

According to one embodiment, the member 10 can comprise at least one arm pivoting from a transverse position of holding of the products 1 to a retracted position, and vice versa.

Figure 7:
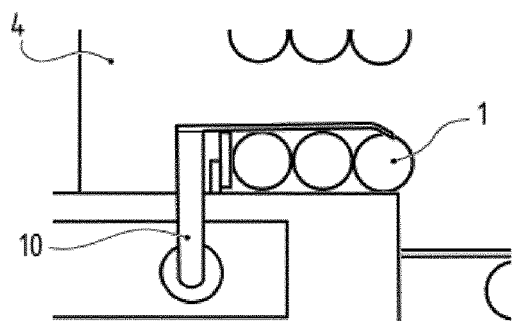
FIG. 7 represents a view similar to FIG. 5, showing the retaining member in a position of holding of a group of products during the transfer.

The holding position is represented in FIG. 7, the pivoting arm enclosing and clamping the products 1, by applying a pressure or else simply by immobilizing them against the pusher 8. The member 10 is therefore used to retain the products 1 during their transfer. To this end, in holding position, it extends, along the first, fetching direction, on the other side of the products 1 with respect to the pusher 8.

Figure 6:
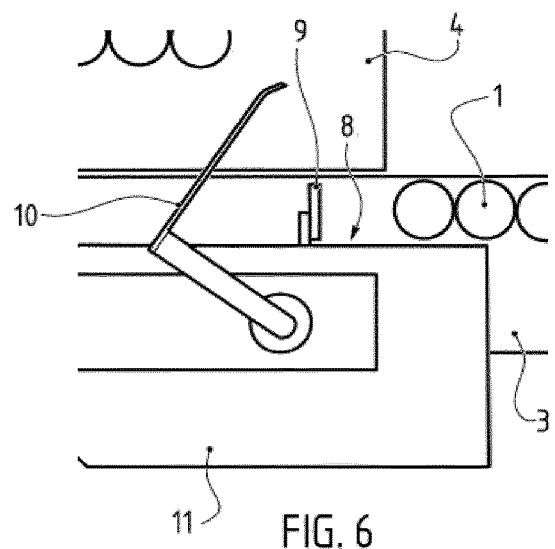
FIG. 6 represents a simplified top view of a detail of the transfer device, showing a retaining member in a retracted position, before transfer.
Figure 8:
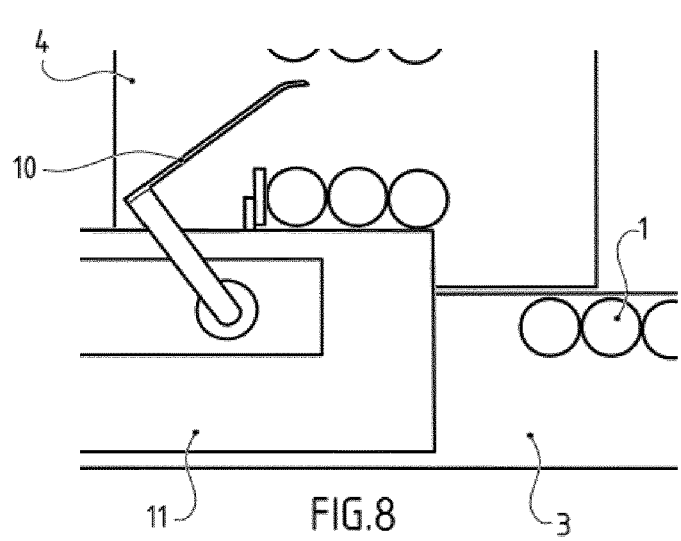
FIG. 8 represents a view similar to FIG. 5, showing the retaining member in an intermediate position of release of the products at the end of the transfer.

In retracted position, as can be seen in FIG. 6, the arm is opened, freeing a space for fetching the products and another transverse space, at the moment the transfer ends, as can be seen in FIG. 8.

Furthermore, the length and the form of the member 10 can be adapted to the form and to the number of products 1 to be transferred.

According to other embodiments, the member 10 can comprise means for gripping the products 1, notably in the form of clamps or tulips. The member 10 can comprise one or more pivoting retainers with horizontal axes with respect to the frame 11 of the tool 5. The member 10 can even comprise latches rotating between each product 1, or even it can be conformed by a linearly and vertically deployed brake.

Thus, the retaining member 10 makes it possible to increase the rate, allowing for greater decelerations along the transverse direction while guaranteeing the stability of the products transferred.

Said member 10 can be embedded on said transfer tool 5, notably its motorization is supported by the frame 11 of said tool 5. The member 10 is incorporated in the tool 5, facilitating the implementation thereof, with simple arrangement of the components, without interference with the other displacements of the tool 5.

Even more, at the moment of release of the products 1 at the end of the transfer, the pivoting trajectory of the member 10 makes it possible, on the one hand, to avoid striking the products 1 released previously and, on the other hand, to leave enough space for the transverse displacement of the products 1 then transported by the output conveyor 4.

Furthermore, the trajectory of the tool 5, at the moment of release and on the return to the landing position, can be configured to ensure avoidance, on the one hand, of the products 1 already transferred to the output conveyor 4 and, on the other hand, of the products 1 being transported by the fetching conveyor 3.

This avoidance trajectory is performed in the fetching direction and the transverse direction, preferentially in combination so as to obtain a relative return trajectory that is notably curved. The avoidance trajectory is determined so as to ensure a synchronization of the tool 5 in terms of speed and position with the new group of products 1 transported by the fetching means 3 and to be transferred to the output conveyor 4.

In order to improve the holding of products 1, during or after their transfer, the device 2 can be provided with an upper conveyor or one commonly referred to as "top belt". Such an upper conveyor can be adjusted in height, according to the size of the products 1. The products 1 are then gripped between the output conveyor 4 and said upper conveyor. Furthermore, the upper conveyor is driven at the same speed as the output conveyor 4, in the same transverse direction.

Also a subject of the invention is a method for transferring products 1, in which at least the products 1 are fetched one behind the other in the first direction. Then, said products 1 are transferred by means of the tool 5 in the direction transversal to said first direction, to at least the output conveyor 4.

During the transfer, the advance of said products 1 in the first direction is at least slowed down.

As explained previously, the slowing-down of the products 1 can be performed against an end stop 9 that is fixed or movable with respect to the frame 11 of the tool 5, by displacement of said frame 11 or by relative displacement of said end stop 9 along said tool 5 in the first, fetching direction.

According to another possibility, the tool 5 may not have an end stop 9, and be provided with collectors of suitable form, preferentially complementing the forms of the products 1 to be secured. These collectors are then used as end stop and ensure the support of the products 1 of a group as it is slowing down, preventing the products 1 from impacting on one another, being displaced or being dropped.

It should be noted that the tool 5 can equally be provided with both an end stop 9 to accompany the slowing-down of the products and collectors to improve the holding of the products.

According to yet another embodiment means, the tool 5 can have no end stop 9, a retaining member 11 as described previously being able to replace such an end stop 9.

Said products 1 are displaced by translation of said tool 5 in a direction transversal to said first, fetching direction.

Preferentially, it is possible to begin displacing said products 1 in the transverse direction while they are slowing down in the first direction.

This displacement of the products 1 can be orthogonal with respect to said first direction.

Furthermore, said products 1 can be grouped together as they are fetched, prior to said transfer. Consequently, the products 1 are transferred in groups.

During their transfer, said products 1 can be held at least transversely.

It is also possible to hold said products 1 at the top during and/or after their transfer across an upper conveyor. Such an upper conveyor can extend above the at least one output conveyor 4, preferably also the fetching means 3, parallel to their top surface. Said upper conveyor is situated at a distance from the top surface of the corresponding conveyor 4 substantially at the height of the products 1, such that they are sandwiched and held between, at the bottom, the surfaces of the fetching means 3 and/or of the conveyor 4, and, at the top, the bottom face of said upper conveyor. Such an upper conveyor is preferably an endless belt conveyor, actuated in the transverse direction, preferably orthogonally to the first direction. Said upper conveyor can be an integral part of the transfer device 1.

Such a transfer method preferentially allows for the implementation of the transfer device 2 according to the invention.

As emerges from the above, the device for transferring products 1 can advantageously comprise:

a means for fetching the products one behind the other in a first direction, at least one output conveyor extending from said fetching means, in a direction transversal with respect to said first direction, a tool for transferring said products in groups from said fetching means to said output conveyor, said transfer tool comprising a pusher of said products extending parallel to said first direction.

Such a transfer device is characterized in that said transfer tool has only two degrees of freedom of movement in a horizontal plane, in said first direction and in said transverse direction, and in that said transfer tool comprises, along said pusher, an element for slowing down said products while they are being transferred transversely.

This slowing-down element can for example be represented by an end stop 9, that is to say a protrusion that can be positioned on the pusher and against which the products 1 arriving along the first direction come into contact.

Such an end stop 9 is preferably mounted along the pusher 8.

It can be fixed so as to be movable or not in the first direction. Preferably, it is fixed so as to be able to be adjusted in the first direction.

This end stop 9 can be situated downstream with respect to the products 1 along the first direction in their driving direction. Said end stop 9 is therefore used to slow down the products 1 during their longitudinal displacement along said first direction, when said products 1 come into contact with this end stop 9.

Such a slowing-down then improves the balance of the products 1 with a view to and/or during their transverse transfer.

According to another possibility, the slowing-down element can be represented by collectors of suitable form. In this case, the tool 5 is provided with collectors of the form preferentially complementing those of the products 1 to be immobilized. These collectors then have the same role as an end stop, namely, to slow down the products 1 to improve their balance with a view to and/or during their transfer.

Such a slowing-down, performed using the slowing-down element, for example an end stop, or even collectors, or even the combination of the two, makes it possible to limit the imbalances at the moment of landing of the products, for their transfer.

The pusher 8 can comprise at least one plate or one collector.

As mentioned previously, the device 2 can comprise a member 10 for retaining the products 1.

Such a member 10 can be represented by any type of member capable of improving the holding of the products 1 during their transfer, whether at the moment of their deceleration in the first, fetching direction, combined or not with the transverse displacement, or else during this transverse displacement only.

As an example, the member 10 can comprise at least one arm pivoting from a transverse position of holding of the products to a retracted position, and vice versa, as described previously.

The presence of such a member 10 makes it possible to further limit the imbalances of the products with a view to and/or during their transfer and, consequently, to perform the transfers more rapidly and therefore improve the rate of processing.

The invention claimed is:

1. A device (2) for transferring products (1) comprising:
    a means (3) for fetching products (1) one behind the other in a first direction,
    at least one output conveyor (4) extending from said fetching means (3), in a transverse direction with respect to said first direction, and
    a tool (5) for transferring said products (1) in groups from said fetching means (3) to said output conveyor (4), said transfer tool (5) comprising a pusher (8) for said products (1) extending parallel to the first direction, and
    a movable member (10) for retaining the products, said movable retaining member (10) configured to keep the products (1) stable during transfer to the output conveyor (4),
    wherein said transfer tool (5) has only two degrees of freedom of movement in a horizontal plane, in said first direction and in said transverse direction.

2. The transfer device (2) as claimed in claim 1, further comprising a means for motorizing the displacement of said transfer tool (5), provided with at least two actuators managing the displacements of the tool (5) for each of said two degrees of freedom independently.

3. The transfer device (2) as claimed in claim 1, further comprising two runners (6) extending parallel to said first direction and to said transverse direction, said transfer tool (5) being mounted to be movable in translation along each of said runners (6).

4. The transfer device (2) as claimed in claim 1, wherein said transverse direction is orthogonal to said first direction.

5. The transfer device (2) as claimed in claim 1, wherein said pusher (8) extends parallel to said first direction, said pusher (8) comprising at least one plate or one collector, forming an element to slow said products.

6. The transfer device (2) as claimed in claim 1, wherein the transfer tool (5) comprises an end stop (9) that is fixed so as to be adjustable in the first direction.

7. The transfer device (2) as claimed in claim 1, wherein said retaining member (10) is embedded on said transfer tool (5).

8. The transfer device (2) as claimed in claim 1, wherein said retaining member (10) comprises at least one arm that pivots from a transverse position, parallel to the transverse direction to a retracted position, parallel to the first direction, and vice versa.

9. The transfer device (2) as claimed in claim 1, wherein the transfer tool (5) comprises along said pusher (8) an element for slowing down said products (1) during their transverse transfer.

10. The transfer device (2) as claimed in claim 9, wherein said pusher (8) extends parallel to said first direction, said pusher (8) comprising at least one plate or one collector, forming an element to slow said products.

11. Transfer device (2) according to any claim 9, wherein the slowing down element is an end stop (9) fixed along the said pusher (8) in an adjustable manner in the first direction.

12. A method for transferring products (1), wherein at least:
    the products (1) are fed one behind the other in a first direction,
    said products (1) are transferred by means of a tool (5) in a direction transversal to said first direction, to at least one output conveyor (4),
    wherein, during the transfer, at least:
    the feed rate of said products (1) in the first direction is slowed down,
    said products (1) are displaced by translation from said tool (5) in a direction transversal to said first, fetching direction, and
    said products (1) are held at least transversely during transfer by a member (10) for retaining the products.

13. The transfer method as claimed in claim 12, wherein said products (1) begin to be displaced in the transverse direction while they are being slowed down in the first direction.

14. The transfer method as claimed in claim 12, wherein the products (1) are displaced orthogonally with respect to said first direction.

15. The transfer method as claimed in claim 12, wherein said products (1) are grouped together when they are fetched, prior to said transfer, and in that the products (1) are transferred in groups.

16. The transfer method as claimed in claim 12, wherein said products (1) are held at least transversally during their transfer.

* * * * *